(12) United States Patent
Genty et al.

(10) Patent No.: US 7,752,443 B2
(45) Date of Patent: *Jul. 6, 2010

(54) METHOD AND SYSTEM FOR A SINGLE-SIGN-ON OPERATION PROVIDING GRID ACCESS AND NETWORK ACCESS

(75) Inventors: Denise Marie Genty, Austin, TX (US); Shawn Patrick Mullen, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/350,471

(22) Filed: Jan. 8, 2009

(65) Prior Publication Data

US 2009/0113533 A1     Apr. 30, 2009

Related U.S. Application Data

(63) Continuation of application No. 10/610,980, filed on Jul. 1, 2003, now Pat. No. 7,496,755.

(51) Int. Cl.
*H04L 9/00* (2006.01)
(52) U.S. Cl. ...................................... 713/170
(58) Field of Classification Search ................. 713/170, 713/175

See application file for complete search history.

(56) References Cited

U.S. PATENT DOCUMENTS

| | | | |
|---|---|---|---|
| 5,944,824 | A | 8/1999 | He |
| 6,286,104 | B1 | 9/2001 | Buhle et al. |
| 6,694,025 | B1 | 2/2004 | Epstein et al. |

(Continued)

FOREIGN PATENT DOCUMENTS

EP     1175038 A2     1/2002

(Continued)

OTHER PUBLICATIONS

"Radiator OSC", retrieved Apr. 10, 2003, 1 page. http://www.open.com.au/radiator/.

(Continued)

*Primary Examiner*—Benjamin E Lanier
*Assistant Examiner*—Devin Almeida
(74) *Attorney, Agent, or Firm*—Yee & Associates, P.C.; Matthew W. Baca

(57) ABSTRACT

A user device initiates a network access authentication operation via a network access device with a network access authentication server, e.g., a Remote Authentication Dial-In User Service (RADIUS) server, which also generates an X.509 proxy certificate and includes the proxy certificate with the information, such as a set of network access parameters, that is returned to the user device in response to a successful completion of the network access authentication operation. The user device extracts and stores the proxy certificate. The network access parameters are used by the user device to communicate via the network access device on a network, which supports a grid. When the user device accesses a resource in the grid, the proxy certificate is already available, thereby obviating the need to generate a new proxy certificate and allowing a user of the user device to experience an integrated single-sign-on for network access and grid access.

2 Claims, 4 Drawing Sheets

U.S. PATENT DOCUMENTS

| | | |
|---|---|---|
| 7,069,440 B2 | 6/2006 | Aull |
| 7,353,383 B2 | 4/2008 | Skingle |
| 2002/0144119 A1 | 10/2002 | Benantar |
| 2002/0176582 A1 | 11/2002 | Aull |
| 2004/0064548 A1 | 4/2004 | Adams et al. |
| 2004/0123232 A1 | 6/2004 | Hodges et al. |
| 2004/0139202 A1 | 7/2004 | Talwar et al. |
| 2005/0021956 A1 | 1/2005 | Genty et al. |
| 2005/0144463 A1 | 6/2005 | Rossebo et al. |

FOREIGN PATENT DOCUMENTS

| | | |
|---|---|---|
| WO | 01/11450 A1 | 2/2001 |

OTHER PUBLICATIONS

"RADIUS Server", Nortel Networks, retrieved Apr. 10, 2003, pp. 1-2. http://www.nortelnetworks.com/products/04/radius.

"Radius Server CX6800-RD", NEC, retrieved Apr. 10, 2003, pp. 1-3. http://www.nec-globalnet.com/products/cx6800rd.html.

"Additional Vendor-Proprietary RADIUS Attributes", CiscoIOS Release 11.3(3)T, no date, pp. 1-6.

"Configuring RADIUS Servers", Ch. 11, Cisco Aironet 1100 Series Access Point Installation and Configuration Guide, Cisco Systems, no date, pp. 1-16.

"Cisco IOS Technologies: RADIUS Support in Cisco IOS Software", Cisco Systems, Apr. 1997, pp. 1-9.

"RADIUS Protocol Security and Best Practices", Microsoft Corp., Jan. 2002, pp. 1-9.

"Microsoft Windows 2000 Server: Access Server Requirements for Interoperability with the Internet Authentication Service", Microsoft Corp., Feb. 2002, 40 pages.

"Cisco-How Does RADIUS Work?", Cisco Systems, Jan. 2003, 5 pages.

Welch et al., "Security for Grid Services", Twelfth International Symposium on High Performance Distributed Computing (HPDC-12) , IEEE Press, Jun. 2003, 14 pages.

Foster et al., "The Anatomy of the Grid: Enabling Scalable Virtual Organizations", International J. Supercomputer Applications, 15(3), 2001, pp. 1-25.

Foster et al., "The Physiology of the Grid: An Open Grid Services Architecture for Distributed Systems Integration", Open Grid Service Infrastructure WG, Global Grid Forum, Jun. 22, 2002, pp. 1-31.

Foster et al., "A Security Architecture for Computational Grids", Proc. 5th ACM Conference on Computer and Communications Security Conference, pp. 83-92, 1998.

Foster et al., "Grid Services for Distributed System Integration", Computer, pp. 37-46, Jun. 2002.

Butler., "A National-Scale Authentication Infrastructure", Computer, pp. 60-66, Dec. 2000.

Tuecke et al., "Internet X.509 Public Key Infrastructure Proxy Certificate Profile", draft-ietf-pkix-proxy-06, Internet Engineering Task Force (IETF), May 2003, pp. 1-45.

Blunk et al., "PPP Extensible Authentication Protocol (EAP)", RFC 2284, Internet Engineering Task Force (IETF), Mar. 1998, pp. 1-15.

Rigney et al., "Remote Authentication Dial In User Service (RADIUS)", RFC 2865, Internet Engineering Task Force (IETF), Jun. 2000, pp. 1-76.

Rigney et al., "RADIUS Accounting", RFC 2866, Internet Engineering Task Force (IETF), Jun. 2000, pp. 1-28.

Rigney et al., "RADIUS Extensions", RFC 2869, Internet Engineering Task Force (IETF), Jun. 2000, pp. 1-47.

Housley et al., "Internet X.509 Public Key Infrastructure Certificate and Certificate Revocation List (CRL) Profile", RFC 3280, Internet Engineering Task Force (IETF), Apr. 2002, pp. 1-129.

Johnson et al., "DOE Science Grid", Jun. 21, 2002, pp. 1-2. http://www.doesciencegrid.org/management/DOE_Science_Grid_highlight_June_21,_2--2002.pdf.

Basney, "NCSA-IPG Collaboration Projects Overview", Feb. 6, 2003, 16 pages. http://www.ncsa.uiuc.edu/~jbasney/ncsa-ipg-fy02.pdf.

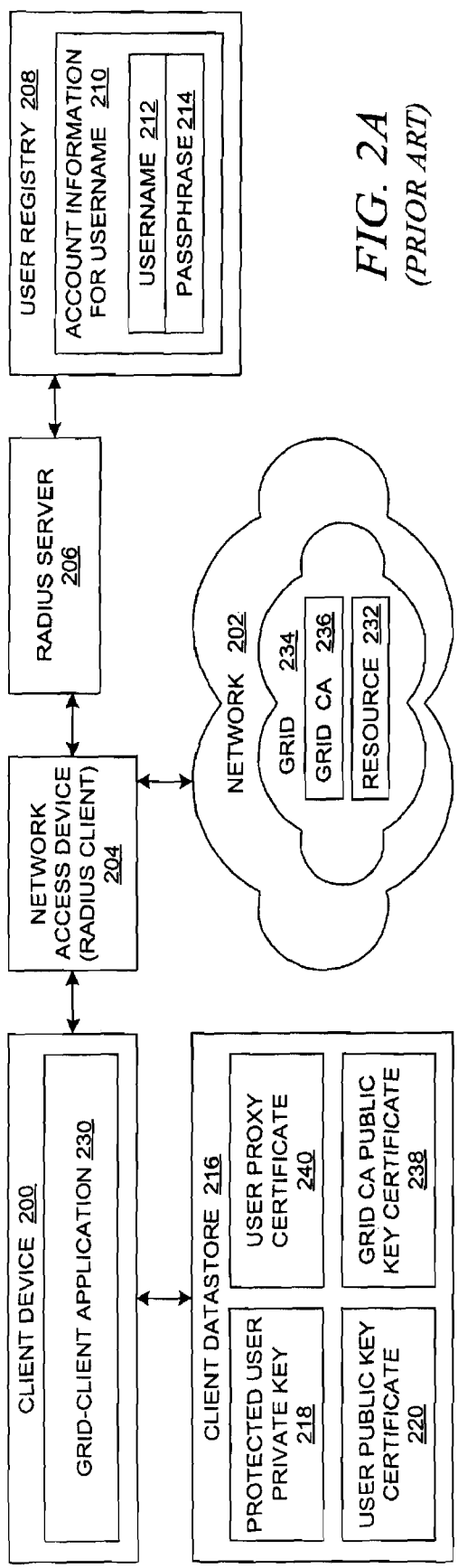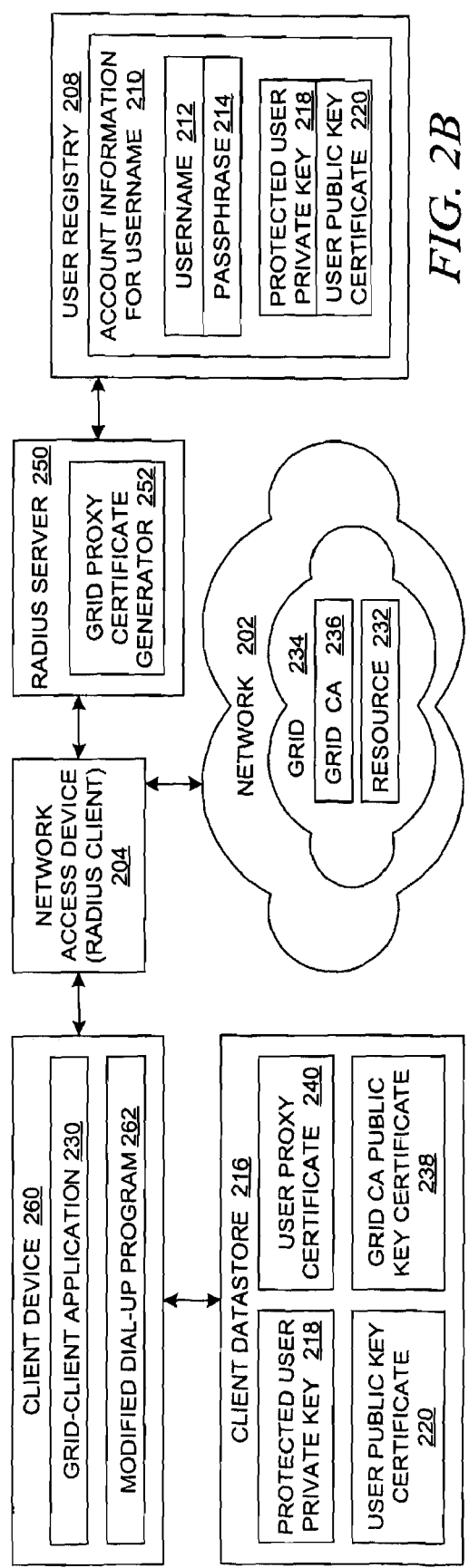

METHOD AND SYSTEM FOR A SINGLE-SIGN-ON OPERATION PROVIDING GRID ACCESS AND NETWORK ACCESS

This application is a continuation of application Ser. No. 10/610,980, filed Jul. 1, 2003.

BACKGROUND OF THE INVENTION

1. Field of the Invention

The present invention relates to an improved data processing system and, in particular, to a method and apparatus for multicomputer data transferring. Still more particularly, the present invention provides a method and apparatus for computer-to-computer authentication.

2. Description of Related Art

Enterprises generally desire to provide authorized users with secure access to protected resources in a user-friendly manner throughout a variety of networks, including the Internet. The Remote Authentication Dial-In User Service (RADIUS) protocol is a server authentication and accounting protocol that secures remote access to networks and that is very commonly used. However, after a properly authenticated user has gained access to a network, a malicious user on the network may eavesdrop on electronic messages from the user or may spoof messages from the user. Concerns about the integrity and privacy of electronic communication have grown with adoption of Internet-based services. Various encryption and authentication technologies have been developed to protect electronic communication, such as asymmetric encryption keys.

The X.509 set of standards for digital certificates has been promulgated to create a common, secure, computational framework that incorporates the use of cryptographic keys. An X.509 digital certificate is an International Telecommunications Union (ITU) standard that has been adopted by the Internet Engineering Task Force (IETF) body. It cryptographically binds the certificate holder, presumably identified by the subject name within the certificate, with its public cryptographic key. This cryptographic binding is based on the involvement of a trusted entity within the Internet Public Key Infrastructure for X.509 certificates (PKIX) called the certifying authority (CA). As a result, a strong and trusted association between the certificate holder and its public key can become public information yet remain tamper-proof and reliable. An important aspect of this reliability is a digital signature that the certifying authority stamps on a certificate before it is released for use. Subsequently, whenever the certificate is presented to a system for use of a service, its signature is verified before the subject holder is authenticated. After the authentication process is successfully completed, the certificate holder may be provided access to certain information, services, or other controlled resources, i.e., the certificate holder may be authorized to access certain systems.

The widespread adoption of Internet-related and Web-related technology has enabled the growth of a global network of interconnected computers that are physically supported by many thousands of organizations and businesses and many millions of individuals, mainly due to adoption of communication protocols like HyperText Transport Protocol (HTTP) but also including the adoption of standards like X.509 certificates to a lesser extent. Recently, enterprises have exerted effort to organize the computational capacity of many computers into a grid, which is a logical organization of many computers for providing a collective sharing of computational capacity and datastore capacity while maintaining local autonomous control over individual computers. Many of these enterprises are cooperating within the Global Grid Forum™, which is supported by GGF, Inc., to develop community-driven standards for grid computing.

The Globus Project™ is one effort that has been supported by government agencies, corporations, and universities to develop grid-related technologies, which has resulted in the development of the Open Grid Services Architecture (OGSA), which is an initiative for incorporating grid concepts within a service-oriented framework based on Web services. The Globus Toolkit® is an implementation of the Open Grid Services Architecture that provides software programming tools for developing grid-enabled applications, and the Grid Security Infrastructure (GSI) is the portion of the Globus Toolkit® that implements security functionality. GSI uses X.509 certificates as the basis for user authentication within a grid.

Although providing secure authentication mechanisms reduces the risks of unauthorized access to protected resources, the same authentication mechanisms may become barriers to user interaction with the protected resources. Users generally desire the ability to jump from interacting with one application to another application without regard to the authentication barriers that protect each particular system supporting those applications.

As users get more sophisticated, they expect that computer systems coordinate their actions so that burdens on the user are reduced. These types of expectations also apply to authentication processes. A user might assume that once he or she has been authenticated by a computer system, the authentication credentials should be valid throughout the user's working session, or at least for a particular period of time, without regard to the various computer architecture boundaries that are sometimes invisible to the user. Enterprises generally try to fulfill these expectations in the characteristics of their operational systems, not only to placate users but also to increase user efficiency, whether the user efficiency is related to employee productivity or customer satisfaction, because subjecting a user to multiple authentication processes in a given time frame may significantly affect the user's efficiency.

Various techniques have been used to reduce authentication burdens on users and computer system administrators. These techniques are generally described as "single-sign-on" (SSO) processes because they have a common purpose: after a user has completed a sign-on operation, i.e., been authenticated, the user is subsequently not required to perform another authentication operation. The goal is that the user would be required to complete only a single authentication process during the user's session.

Due to the highly distributed nature of a grid, efforts have been made to incorporate the concept of single-sign-on functionality into the infrastructure of grid architectures. For example, the Globus Toolkit® implements single-sign-on functionality through the use of X.509 proxy certificates; the single-sign-on functionality applies to resources within the grid so that a user of multiple services within the grid is not required to pass an authentication challenge for each service that is used.

However, a user is typically required to pass an authentication challenge to gain initial access to a network prior to attempting to access services within a grid. After the user has completed an authentication operation with respect to the network, the user may then attempt to gain access to resources in a grid via the network. Hence, a user is typically required to pass two authentication challenges to gain access to resources in a grid, which is contrary to the concept of a single-sign-on operation and diminishes the efforts of incorporating single-sign-on functionality within a grid infrastructure.

Therefore, it would be advantageous to have a method for providing a single-sign-on operation that, when successfully completed, allows access to a network while subsequently allowing access to resources in a grid that is accessed through the network. It would be particularly advantageous to provide a single-sign-on operation that is compliant with entities that are commonly implemented in accordance with standard specifications, such as a RADIUS server and a Globus™-enabled grid.

SUMMARY OF THE INVENTION

A user registry for a network access authentication server, such as a RADIUS server, is configured to hold a user's private key and the user's public key certificate, which are then available to the network access authentication server during a network access authentication operation, e.g., as implemented in accordance with the RADIUS protocol. Using the information in the user registry, the network access authentication server is able to generate a proxy certificate for the user during a network access authentication operation for the user. The proxy certificate is returned along with the network access parameters to a user device via a network access device. The proxy certificate is stored at the user device in an appropriate location, and the proxy certificate is then available to grid-client applications when jobs are submitted into the grid.

At some subsequent point in time, a grid-client application prepares the submission of a job into the grid. When the grid-client application finds a valid, fresh, proxy certificate that was previously stored during the network access authentication operation, the grid-client application foregoes the generation of a new proxy certificate. Hence, the need for an authentication operation that would be associated with the generation of a new proxy certificate is obviated by the fact that a new proxy certificate does not need to be generated on the user device at that time.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 2A depicts a block diagram that shows a typical data processing system that includes a user device that accesses a network and a grid via the network;

FIG. 2B depicts a block diagram that shows a data processing system that includes a user device that accesses a network and a grid in accordance with an embodiment of the present invention;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
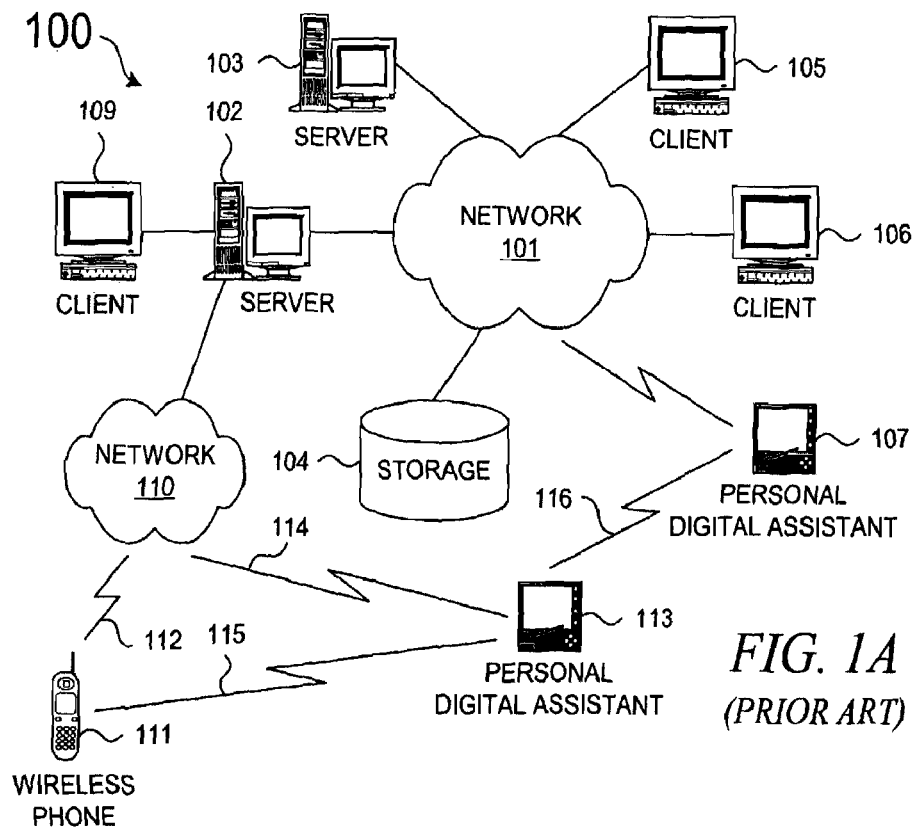
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116. The present invention could be implemented on a variety of hardware platforms; FIG. 1A is intended as an example of a heterogeneous computing environment and not as an architectural limitation for the present invention.

Figure 1B:
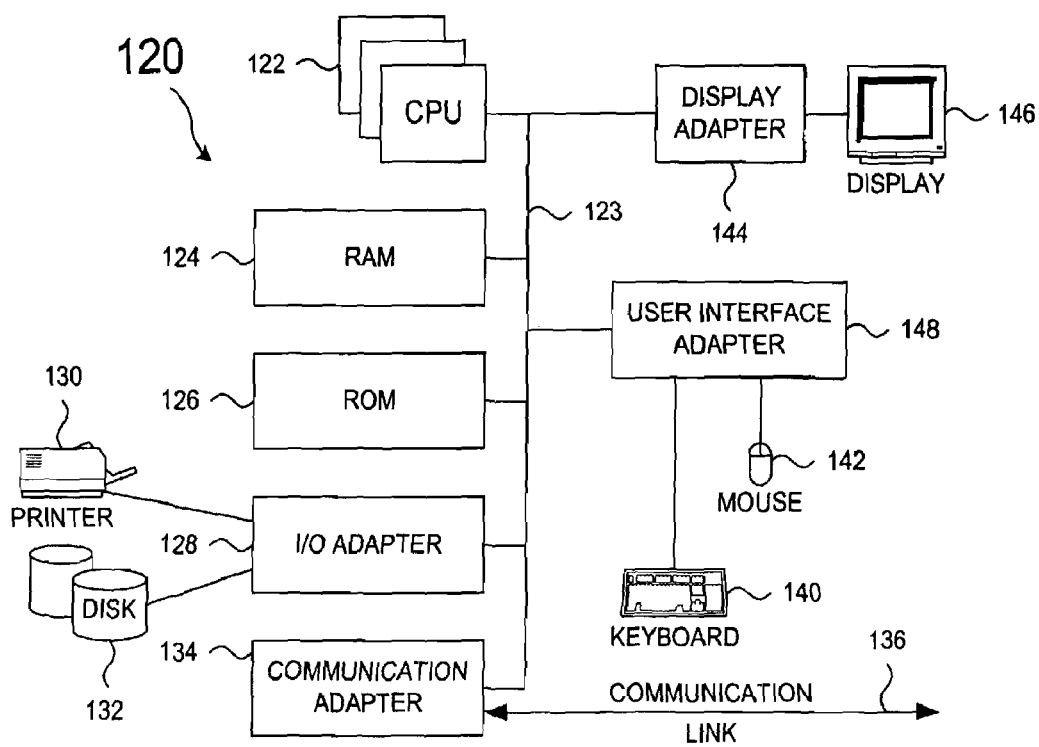
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats and languages, such as graphic files, word processing files, Extensible Markup Language (XML), Hypertext Markup Language (HTML), Handheld Device Markup Language (HDML), Wireless Markup Language (WML), and various other formats and types of files.

The descriptions of the figures herein involve certain actions by either a user device or a user of the device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" may sometimes be used interchangeably without significantly affecting the meaning of the described processes.

The present invention may be implemented on a variety of hardware and software platforms, as described above with respect to FIG. 1A and FIG. 1B. More specifically, though, the present invention is directed to an improved authentication operation that uses digital certificates. Prior to describing the improved authentication service in more detail, the use of asymmetric cryptographic keys and digital certificates is described.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e., kept secret. In a typical asymmetric cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication via digital signatures as well as for privacy via encryption. Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message.

For example, when a sender encrypts a message, the public key of the receiver is used to transform the data within the original message into the contents of the encrypted message. A sender uses a public key of the intended recipient to encrypt data, and the receiver uses its private key to decrypt the encrypted message.

When authenticating data, data can be signed by computing a digital signature from the data using the private key of the signer. Once the data is digitally signed, it can be stored with the identity of the signer and the signature that proves that the data originated from the signer. A signer uses its private key to sign data, and a receiver uses the public key of the signer to verify the signature.

A certificate is a digital document that vouches for the identity and key ownership of entities, such as an individual, a computer system, a specific server running on that system, etc. Certificates are issued by certificate authorities. A certificate authority (CA) is an entity, usually a trusted third party to a transaction, that is trusted to sign or issue certificates for other people or entities. The CA usually has some kind of legal responsibilities for its vouching of the binding between a public key and its owner that allow one to trust the entity that signed a certificate. There are many such commercial certificate authorities. These certificate authorities are responsible for verifying the identity and key ownership of an entity when issuing the certificate.

If a certificate authority issues a certificate for an entity, the entity must provide a public key and some information about the entity. A software tool, such as specially equipped Web browsers, may digitally sign this information and send it to the certificate authority. The certificate authority might be a company that provides trusted third-party certificate authority services. The certificate authority will then generate the certificate and return it. The certificate may contain other information, such as a serial number and dates during which the certificate is valid. One part of the value provided by a certificate authority is to serve as a neutral and trusted introduction service, based in part on their verification requirements, which are openly published in various certification service practices (CSPs).

A CA creates a new digital certificate by embedding the requesting entity's public key along with other identifying information and then signing the digital certificate with the CA's private key. Anyone who receives the digital certificate during a transaction or communication can then use the public key of the CA to verify the signed public key within the certificate. The intention is that the CA's signature acts as a tamper-proof seal on the digital certificate, thereby assuring the integrity of the data in the certificate.

Other aspects of certificate processing are also standardized, and more information about the X.509 public key infrastructure (PKIX) can be obtained from the Internet Engineering Task Force (IETF) at www.ietf.org. For example, the Certificate Request Message Format (RFC 2511) specifies a format that has been recommended for use whenever a relying party is requesting a certificate from a CA. Certificate management protocols have also been promulgated for transferring certificates. Since the present invention resides in a distributed data processing system that processes digital certificates, FIGS. 1C and 1D are used to illustrate some useful background information about digital certificates.

Figure 1C:
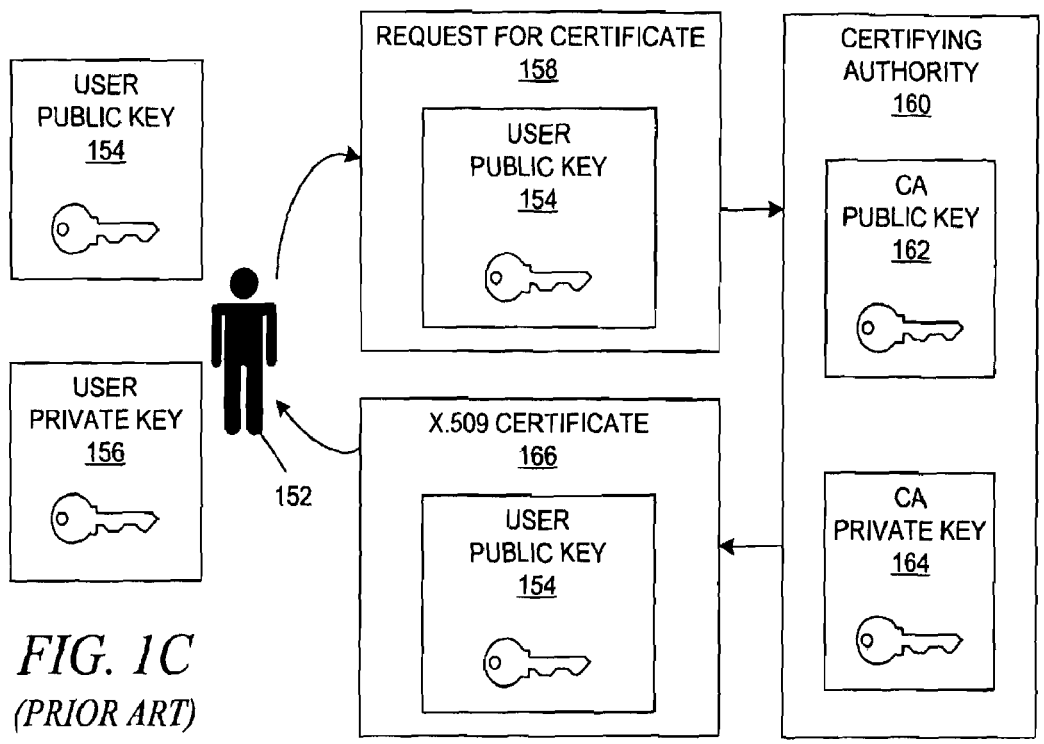
FIG. 1C depicts a typical manner in which an entity obtains a digital certificate.

With reference now to FIG. 1C, a block diagram depicts a typical manner in which an individual obtains a digital certificate. User 152, operating through some type of client computer, has previously obtained or generated a public/private key pair, e.g., user public key 154 and user private key 156. User 152 generates a request for certificate 158 containing user public key 154 and sends the request to certifying authority 160, which is in possession of CA public key 162 and CA private key 164. Certifying authority 160 verifies the identity of user 152 in some manner and generates X.509 digital certificate 166 containing user public key 154. The entire certificate is signed with CA private key 164; the certificate includes the public key of the user, the name associated with the user, and other attributes. User 152 receives newly generated digital certificate 166, and user 152 may then present digital certificate 166 as necessary to engage in trusted transactions or trusted communications. An entity that receives digital certificate 166 from user 152 may verify the signature of the CA by using CA public key 162, which is published in the certifying authority's public key certificate, which is available to (or obtainable by) the verifying entity.

Figure 1D:
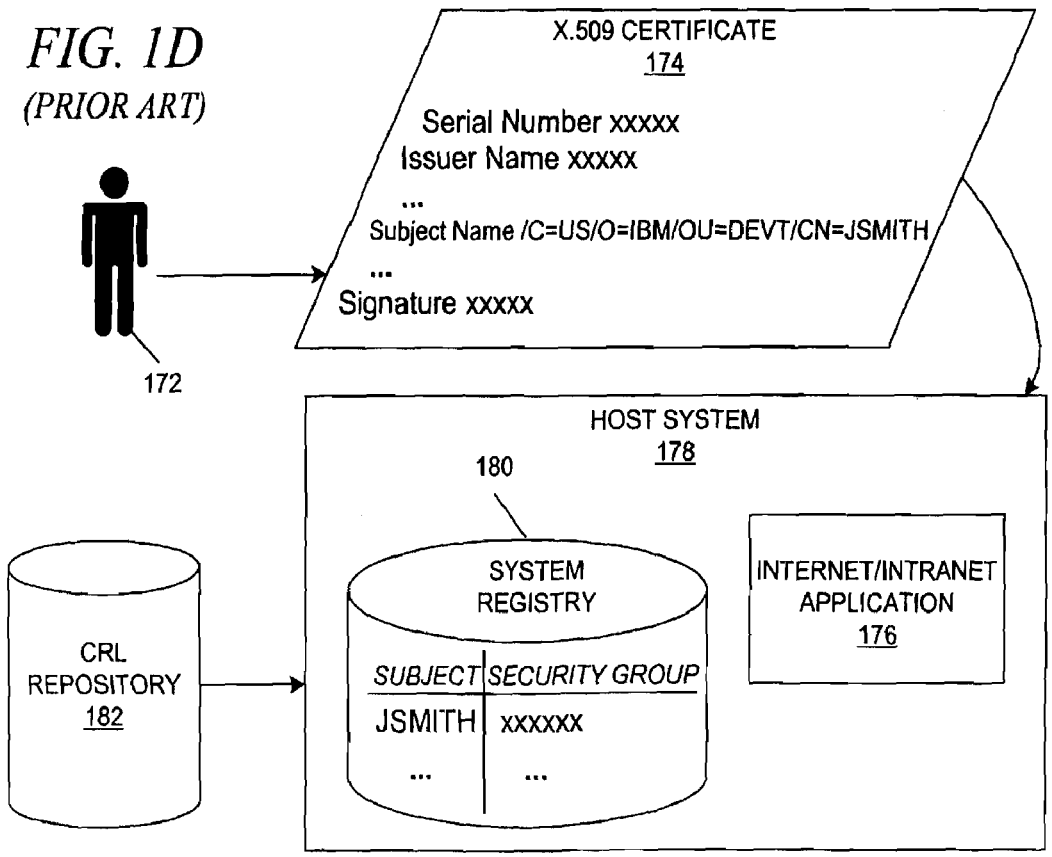
FIG. 1D depicts a block diagram that shows a typical manner in which an entity may use a digital certificate within a distributed data processing system.

With reference now to FIG. 1D, a block diagram depicts a typical manner in which an entity may use a digital certificate to be authenticated to an Internet system or application. User 172 possesses X.509 digital certificate 174, which is transmitted to (or obtainable by) application 176 on host system 178; application 176 comprises X.509 functionality for processing and using digital certificates. User 172 signs or encrypts data that it sends to application 176 with its private key.

The entity that receives or obtains certificate 174 may be an application, a system, a subsystem, etc. Certificate 174 contains a subject name or subject identifier that identifies user 172 to application 176, which may perform some type of service for user 172. The entity that uses certificate 174 verifies the authenticity of the certificate before using the certificate with respect to the signed or encrypted data from user 172.

Host system 178 may also contain system registry 180 which is used to authorize user 172 for accessing services and resources within system 178, i.e., to reconcile a user's identity with user privileges. For example, a system administrator may have configured a user's identity to belong to certain a security group, and the user is restricted to being able to access only those resources that are configured to be available to the security group as a whole. Various well-known methods for imposing an authorization scheme may be employed within the system.

As noted previously with respect to the prior art, in order to properly validate a digital certificate, an application must check whether the certificate has been revoked. When the certifying authority issues the certificate, the certifying authority generates a unique serial number by which the certificate is to be identified, and this serial number is stored within the "Serial Number" field within an X.509 certificate. Typically, a revoked X.509 certificate is identified within a CRL via the certificate's serial number; a revoked certificate's serial number appears within a list of serial numbers within the CRL.

In order to determine whether certificate 174 is still valid, application 176 obtains a certificate revocation list (CRL) from CRL repository 182 and validates the CRL. Application 176 compares the serial number within certificate 174 with the list of serial numbers within the retrieved CRL, and if there are no matching serial numbers, then application 176 validates certificate 174. If the CRL has a matching serial number, then certificate 174 should be rejected, and application 176 can take appropriate measures to reject the user's request for access to any controller resources.

With reference now to FIG. 2A, a block diagram depicts a typical data processing system that includes a user device that accesses a network and a grid via the network. User device 200 sends and receives data on network 202 through network access device 204. User device 200 is similar to clients 105-107 that are shown in FIG. 1A, while network 202 is similar to network 101 in FIG. 1A. Network access device 204 may be a network access server, Ethernet switch, wireless access point, or other type of network access device that is able to run the Remote Authentication Dial-In User Service (RADIUS) protocol or similar protocol for authenticating and authorizing connections.

Network access authentication server 206 handles requests to authenticate and authorize a user to connect to a network using an appropriate protocol; in a preferred embodiment, server 206 supports the RADIUS protocol, in which case network access device 204 would be regarded as a RADIUS client and user device 200 would be regarded as an access client. Server 206 may be operated by a variety of entities, e.g., by a corporation that operates many access clients, such as desktop computers, or by an Internet Service Provider (ISP) that sells its service to an individual user that operates an access client.

Server 206 stores and retrieves user information within user registry 208, which may be a database or other type of datastore. User registry 208 stores account information for each user for which network access is to be controlled by server 206. It may be assumed that a system administrator for the operator of server 206 completes a registration operation for each user. User registry 208 is illustrated as containing account information 210 for a particular user that operates user device 200, but account information for other users would also be stored within user registry 208; account information 210 contains username 212 and passphrase 214 for that particular user.

Assuming that server 206 is operating according to the RADIUS protocol, user device 200 may gain access to network 202 in the following simplified example. User device 200 initiates a point-to-point protocol (PPP) authentication operation with network access device 204, e.g., in response to a user of user device 200 starting a web browser application that, in turn, automatically starts a dial-up networking program. Network access device 204 responds with a request for a username and passphrase, and user device 200 obtains a username and its associated passphrase from the user and returns the value pair to network access device 204, which sends the username and passphrase to RADIUS server 206; it may be assumed that the passphrase is protected by appropriate encryption throughout the process. RADIUS server 206 validates the received username/passphrase combination with information in user registry 208 and responds with an accept response or a reject response. Assuming that the user information is successfully validated, RADIUS server 206 returns configuration information to network access device 204 that it requires to provide service to user device 200, e.g., a list of attribute-value pairs that describe the parameters to be used for a session, such as an IP address to be assigned to user device 200. Network access device 204 returns information to user device 200, and user device 200 proceeds to send data traffic to network access device 204, which transmits the data onto network 202.

When necessary to access services within network 202, applications that execute on user device 200 have access to client datastore 216, which stores user private key 218 in a protected manner along with its associated user public key certificate 220; user private key 218 may be encrypted using passphrase 214 or some other secret information, or it may be protected through some other means. User device 200 may support many different types of applications, such as a web browser application, and client datastore 216 may be implemented as one or more datastores in a variety of different forms, including storage within or controlled by various applications.

User device 200 also supports grid-client application 230, i.e., a client application that is enabled to request or access service/resource 232 within grid 234; the form of grid-client application 230 may vary, e.g., a stand-alone program, an applet, or some form of software module. As mentioned above, a grid is a logical/virtual organization of many computers for providing a collective sharing of computational capacity and datastore capacity while maintaining local autonomous control over individual computers. Since a grid is a virtual organization of physically supported elements within one or more networks, and since network 202 represents one or more networks (which may include the Internet), grid 234 is illustrated within FIG. 2A as a subset of resources within network 202.

In a preferred implementation of the present invention, grid-client application 230 operates in accordance with the Globus Toolkit®, aspects of which are briefly described hereinbelow. Jobs are submitted into a grid through use of a "globusrun" command, and each job is accompanied by a X.509 proxy certificate, which is used to authenticate a user or a grid client. Hence, a proxy certificate must be created before a job can be run on a grid.

When a proxy certificate is transmitted to a grid service by a grid client, the grid client grants the right for the grid service to be authorized with other grid services as if it were the grid client. As a job is processed within a grid, multiple services may be triggered to assist in the processing of the submitted job. Since the proxy certificate accompanies the job within a grid, it facilitates a single-sign-on operation within the grid; authentication challenges are not generated for each access to a grid resource or service.

A proxy certificate is a short-term session certificate with a limited lifetime, typically on the order of a few hours. A particular proxy certificate is based on a particular public key certificate; the subject that is identified within a public key certificate can generate a proxy certificate. The corresponding private key for the particular public key within the public key certificate is used to digitally sign the proxy certificate, thereby allowing the proxy certificate to be validated in accordance with the hierarchical trust path that is implicit in the use of X.509 certificates, as explained in more detail below.

In the example that is shown in FIG. 2A, grid certificate authority (CA) 236 issues certificates to users that will use the certificates within grid 234, e.g., in a manner similar to that described above with respect to FIGS. 1C and 1D. In an alternate embodiment, a different CA may be employed which is independent of the grid, e.g., a third-party vendor that is trusted to issue certificates for other organizations in addition to those who support grid 234. However, in order to obtain the benefits of single-sign-on operations within grid 234, it should be assumed that all resources within grid 234 trust a given CA, such as CA 236. In other words, grid CA 236 is considered to be a root CA with respect to grid 234. With respect to the present invention, though, it is sufficient to assume that the user/subject of public key certificate 220 and grid resource/service 232 both trust grid CA 236.

Public key certificate 220 has been signed by CA 236 using its private key. In general, when user device 200 initiates a transaction with service 232 by sending service 232 a transaction request message, it signs a transaction-related message with its private key 218. User device 200 may transmit a copy of public key certificate 220 to service 232 along with the transaction-related message, or service 232 can obtain a copy of public key certificate 220 from a known location, such as an LDAP directory. Using the public key in the public key certificate 220 that corresponds to private key 218 that was used to sign the transaction-related message, service 232 validates the digital signature on the transaction-related message.

In a similar manner, service 232 validates the authenticity of the received or retrieved copy of public key certificate 220 using the public key in a copy of the public key certificate of CA 236 that corresponds to the CA's private key that was used to sign public key certificate 220. Service 232 may obtain a copy of the public key certificate of CA 236 from a known location, or a copy of the public key certificate of CA 236 may also be transmitted along with the transaction-related message; user device 200 may store a copy of CA public key certificate 238. In this manner, a so-called hierarchical chain of trust, trust path, or certificate path is formed; validation may proceed up the trust path to a root CA, if necessary. Since service 232 implicitly trusts CA 236, service 232 is said to trust the transaction-related message as having been authentically generated by the subject that is identified within public key certificate 220.

In a similar fashion, user device 200 can act as a certificate authority to generate proxy certificate 240 that is signed using private key 218; the generated proxy certificate contains a unique name and the public key of an asymmetric cryptographic key pair. When proxy certificate 240 is transmitted to service 232 by user device 200, service 232 can validate the trust path of proxy certificate 240 using public key certificate 220, CA public key certificate 238, and other certificates in trust path, if necessary. Due to the nature of proxy certificate 240, service 232 may then act as a proxy on behalf of user device 200 with respect to other services.

As noted above, grid-client application 230 operates in accordance with the Globus Toolkit® in a preferred implementation of the present invention, and a proxy certificate must be created before a job can be run on a grid using the Globus Toolkit®. The "grid-proxy-init" command creates a proxy certificate, which it stores within a particular file. In one implementation, the file is stored at pathname "/tmp/<filename>", wherein the file name is "x509up_u<uid>", and wherein the user identifier is associated with the user that is running the "grid-proxy-init" command. This file stores the proxy certificate along with its corresponding private key and a copy of the public key certificate on which the proxy certificate is based.

The user's private key that is used to digitally sign the proxy certificate remains encrypted within a different file; in one implementation, it is stored in the file "$HOME/.globus/userkey.pem". The private key can be accessed with the user's grid passphrase; in one implementation, this passphrase is the same passphrase that was provided by the user when the user's public key certificate was created by a grid certificate authority through the use of the "grid-cert-request" command.

Hence, when the user operates grid-client application 230, grid-client application 230 uses a proxy certificate, which is stored in a particular file; "grid-proxy-init" should have been run beforehand to create the proxy certificate. When the "globusrun" command is invoked, the executing routine knows the file location from which to retrieve the proxy certificate to accompany the job that is submitted into the grid.

As mentioned above, the grid single-sign-on functionality that is implemented through the use of proxy certificates only applies to resources within the grid. Therefore, after the user has completed an authentication operation with respect to the network through a network access authentication server, the user would be challenged to complete another authentication operation with respect to the grid through a grid-client application. Hence, in the prior art, a user is typically required to pass two authentication challenges to gain access to resources in a grid, which is contrary to the concept of a single-sign-on operation and diminishes the efforts of incorporating single-sign-on functionality within a grid infrastructure. The present invention provides a solution to this problem.

With reference now to FIG. 2B, a block diagram depicts a data processing system that includes a user device that accesses a network and a grid in accordance with an embodiment of the present invention. FIG. 2B is similar to FIG. 2A, and similar element numerals refer to similar features. However, in the example in FIG. 2B, the user account information in the user registry has been modified to include a copy of each grid user's protected private key 218 and public key certificate 220. In addition, the network access authentication server and the user device in FIG. 2A have been modified to include additional functionality. In FIG. 2B, network access authentication server 250 comprises grid proxy certificate generator 252, and user device 260 comprises modified dial-up program 262. The manner in which the modified account information and additional functionality is employed is described in more detail further below.

Figure 3:
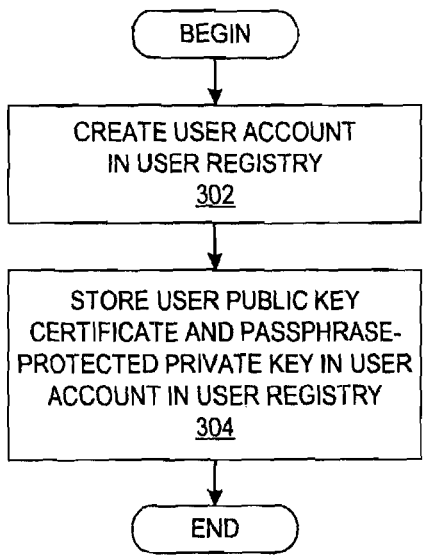
FIG. 3 depicts a flowchart that shows a process for establishing grid-related information within the user registry in accordance with an embodiment of the present invention.

With reference now to FIG. 3, a flowchart depicts a process for establishing grid-related information within the user registry in accordance with an embodiment of the present invention. The process commences with a typical user registration operation to establish a user account within a user registry database that is used by a network access authentication server, such as a RADIUS server (step 302); this user registration operation is substantially similar to the user registration operation that would be required within the data processing system that is shown in FIG. 2A. The network access authentication server subsequently uses the user registry to determine if a user should be allowed access to a network.

In contrast to the data processing system that is shown in FIG. 2A, though, the data processing system that is shown in FIG. 2B requires the storage of additional information within a particular user's account information if that particular user is to have the benefit of the present invention. Hence, during the user registration operation, the user's private key and the user's public key certificate are also stored in association with the user's other account information (step 304), which concludes the modified registration process. The user's private key would preferably be protected in some manner, e.g., by encrypting it with the user's passphrase. These data items may be transferred to the account registrar through an out-of-band process; e.g., a system administrator may be responsible for obtaining the user's private key and the user's public key certificate directly from the user.

Figure 4:
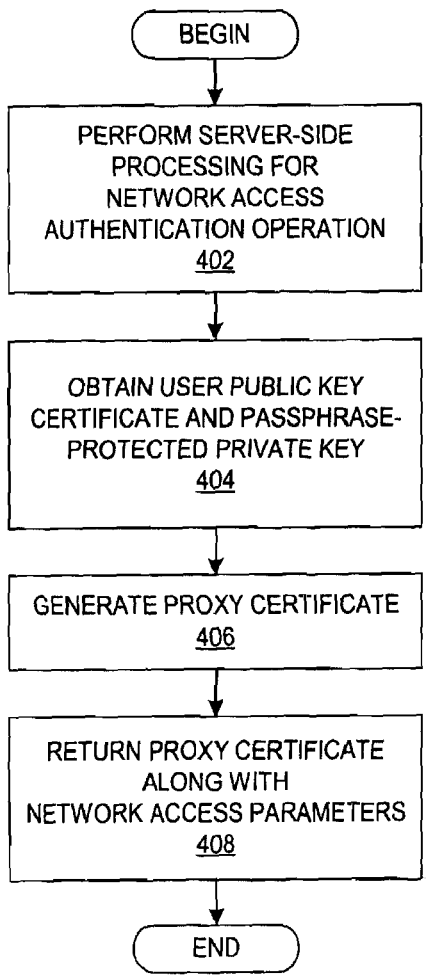
FIG. 4 depicts a flowchart that shows a server-side process for integrating the authentication operation for network access with the authentication operation for grid access to provide a combined network-and-grid single-sign-on operation in accordance with an embodiment of the present invention.
Figure 5:
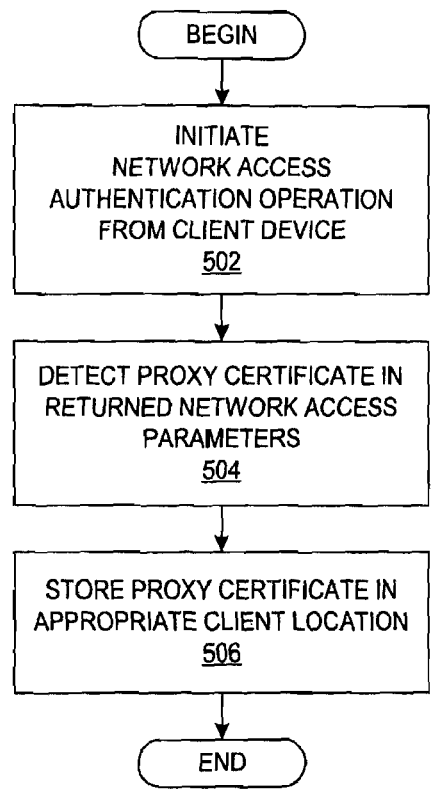
FIG. 5 depicts a flowchart that shows a client-side process for integrating the authentication operation for network access with the authentication operation for grid access to provide a combined network-and-grid single-sign-on operation in accordance with an embodiment of the present invention.

With reference now to FIG. 4, a flowchart depicts a server-side process for integrating the authentication operation for network access with the authentication operation for grid access to provide a combined network-and-grid single-sign-on operation in accordance with an embodiment of the present invention. FIG. 4 depicts part of the processing for the single-sign-on operation that occurs on a server, while FIG. 5 depicts part of the processing for the single-sign-on operation that occurs on a user device. The process commences with the network access authentication server performing a network access authentication operation (step 402). It is assumed that the user is successfully authenticated; if not, then an appropriate rejection response would be returned. For example, a RADIUS server with extended functionality, such as the grid proxy certificate generator function as shown in FIG. 2B, performs an authentication operation in accordance with the RADIUS protocol, as described above with respect to FIG. 2A.

However, before returning the network access parameters for a successful authentication, the network access authentication server obtains a copy of the user's private key and a copy of the user's public key certificate (step 404), e.g., copies from the user account registry; if the user's private key is protected, the encrypted copy of the user's private key is decrypted. It is assumed that the user's account information contains a copy of the user's private key and a copy of the user's public key certificate, e.g., by completion of the process that is shown in FIG. 3, although steps 404 and 406 could be controlled in a selective manner if there are some users that do not access the grid. For example, the user's account information may include a value that indicates whether or not the user is a grid user that has a need for an integrated network-grid single-sign-on operation.

Assuming that the user requires access to the grid, the network access authentication server generates a proxy certificate (step 406) in a manner similar to that described above; the proxy certificate contains some information that has been copied from the user's public key certificate, e.g., the "Subject" identifier, and the proxy certificate is digitally signed with the user's private key. The network access authentication server then returns the proxy certificate along with the network access parameters (step 408), thereby concluding the integrated authentication process. For example, a RADIUS server with extended functionality, such as the grid proxy certificate generator function as shown in FIG. 2B, is able to return the proxy certificate within vendor-specific attributes (VSA) that allow vendors to support extended attributes within the RADIUS protocol.

With reference now to FIG. 5, a flowchart depicts a client-side process for integrating the authentication operation for network access with the authentication operation for grid access to provide a combined network-and-grid single-sign-on operation in accordance with an embodiment of the present invention. The process commences with a user device initiating and participating in a network access authentication operation while attempting to gain access to a network (step 502).

At some subsequent point in time, a set of network access parameters are returned from a network access authentication server, which the user device stores for use in generating the appropriate network packets for communicating on the network. A modified dial-up program has been previously configured on the user device; the modified dial-up program participates in the network access authentication operation, and the modified dial-up program processes the returned network access parameters. As the network access parameters are being returned, the modified dial-up program detects the presence of a proxy certificate (step 504). The modified dial-up program extracts the proxy certificate and stores it in an appropriate file on the user device (step 506), thereby concluding the process. For example, if the user device is configured with applications that use the Globus Toolkit®, the modified dial-up program creates a file that contains the proxy certificate.

In the present invention, a typical user device and a typical network access authentication server have been modified to accommodate the transfer of the proxy certificate. The manner in which the proxy certificate is transmitted from the network authentication server to the user device may vary in different embodiments of the present invention. In a preferred embodiment of the present invention, the user device and the network access authentication server support the functionality as described below.

The user device communicates with the network access device using the PPP Extensible Authentication Protocol (related to the Point-to-Point Protocol (PPP) and abbreviated as EAP); EAP is defined within Blunk et al., "PPP Extensible Authentication Protocol (EAP)", RFC 2284, Internet Engineering Task Force (IETF), March 1998. As described within RFC 2284, PPP provides a standard method for transporting multi-protocol datagrams over point-to-point links. In order to establish communications over a point-to-point link, each end of the PPP link must initially send Link Control Protocol (LCP) packets to configure the data link during the link establishment phase. After the link has been established, PPP provides for an optional authentication phrase before proceeding to the Network-Layer Protocol phase. By default, authentication is not mandatory, but if authentication of the link is desired, an implementation must specify the Authentication-Protocol Configuration Option during the link establishment phase; EAP defines a particular authentication protocol. When the connection authentication phase is reached, the endpoint devices (sometimes referred to as "peers") negotiate the use of a specific EAP authentication scheme known as an EAP type.

EAP defines a request packet and a response packet; each request has a type field that indicates what information is being requested. EAP defines a set of initial EAP Types that are used in request/response exchanges. Once the EAP type is agreed upon, EAP allows for an open-ended exchange of messages between the user device (the access client) and the network access authenticating server (e.g., the RADIUS server) that can vary based on the parameters and needs of the connection. The conversation between the endpoints consists of a series of requests for authentication information and responses.

The present invention may use EAP-defined "Type 6", which is typically used for supporting generic token cards that require user input. The request typically contains an ASCII text message. The reply typically contains the token card information that is necessary for authentication; typically, this would be information that is read by a user from the token card device and then entered as ASCII text.

In the preferred embodiment, after the authentication information (username/passphrase) has already been requested from the user device and received from the user device, the proxy certificate is transferred to the user device as an EAP request of "Type 6", which can have a variable length of up to 64 kilobytes, which is more than sufficient for holding a proxy certificate; the proxy certificate may be transformed into an all-ASCII text string in accordance with a variety of algorithms, such as UU-encoding.

In this manner, this data field is "overloaded" to carry a data payload other than what is intended by the EAP specification. Thus, the content of the EAP response from the user device may have a variety of information, such as an acknowledgment or variable dummy data.

EAP is designed to allow authentication plug-in modules at both endpoints, thereby allowing a vendor with the opportunity to provide a new authentication scheme. The modified dial-up program on the user device recognizes the overloaded EAP request of "Type 6", extracts the content payload of the ASCII text; it transforms the ASCII text if necessary, e.g., through a UU-decoding algorithm, to obtain the proxy certificate, which it then stores in an appropriate location, e.g., a file that is used by a grid-client application as described above.

The network access device merely transfers the content of the authentication packets, so the network access device is not affected by the manner in which the proxy certificate is transferred. In a preferred embodiment of the present invention that implements the RADIUS protocol, the network access device supports so-called "EAP over RADIUS", which is the passing of EAP messages of any EAP type through the network access device to the RADIUS server. An EAP message sent between the access client (the user device) and the RADIUS server is formatted as an "EAP-Message" attribute and sent in a RADIUS message between the network access device and the RADIUS server. Thus, the network access device becomes a pass-through device that passes EAP messages between the access client and the RADIUS server; processing of EAP messages occurs at the access client and the RADIUS server, not at the network access device.

The network access device is merely required to support the negotiation of EAP as an authentication protocol and the passing of EAP messages to a RADIUS server, which is functionality that is provided by many commercially-available network access devices. It should be noted that the "EAP-Message" attribute is defined in Rigney et al., "RADIUS Extensions", RFC 2869, IETF, June 2000. Hence, in a preferred embodiment of the present invention, the network access device is configured to use EAP and to use RADIUS as its authentication provider. When a connection attempt is made, the user device negotiates the use of EAP with the network access device. When the user device sends an EAP message to the network access device, the network access device encapsulates the EAP message as a RADIUS message and sends it to its configured RADIUS server. The RADIUS server processes the EAP message and sends a RADIUS-formatted EAP message back to the network access device, which then forwards the EAP message to the user device.

The advantages of the present invention should be apparent in view of the detailed description that is provided above. A user registry for a network access authentication server, such as a RADIUS server, is configured to hold a user's private key and the user's public key certificate, which are then available to the network access authentication server during a network access authentication operation, e.g., as implemented in accordance with the RADIUS protocol. Using the information in the user registry, the network access authentication server is able to generate a proxy certificate for the user during a network access authentication operation for the user. The proxy certificate is returned along with the network access parameters to a user device via a network access device. The proxy certificate is stored at the user device in an appropriate location, and the proxy certificate is then available to grid-client applications when jobs are submitted into the grid.

At some subsequent point in time, a grid-client application prepares the submission of a job into the grid. When the grid-client application finds a valid, fresh, proxy certificate that was previously stored during the network access authentication operation, the grid-client application uses it. Hence, the need for an authentication operation that would be associated with the generation of a new proxy certificate is obviated by the fact that a new proxy certificate does not need to be generated on the user device at that time. In this manner, only one authentication operation is performed with respect to network access and grid access, thereby achieving a single-sign-on experience for the user of the network and the grid.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A tangible computer readable medium storing a computer program product which, when executed by a processor, performs a computer implemented method comprising:
    initiating a network access authentication operation from a user device to a network access authentication server via a network access device, wherein initiating comprises transmitting to the network access device a private key associated with the user device and a public key associated with the user device;
    receiving information including a set of network access parameters at the user device in response to a successful completion of the network access authentication operation, wherein the information further comprises a proxy certificate generated by the network access authentication server, wherein the proxy certificate is a short-term session certificate with a limited lifetime on the order of a few hours, wherein the proxy certificate comprises second information copied from the public key, and wherein the proxy certificate is signed with the private key;
    storing the proxy certificate at the user device;
    sending a transaction request message from the user device into a grid via the network access device, wherein the transaction request message comprises the proxy certificate and a request to use grid resources, wherein the grid comprises a virtual organization of a plurality of computers that provide a collective sharing of computational capacity and data storage capacity while maintaining local autonomous control over individual computers in the plurality of computers, wherein a user is required to pass both a first authentication challenge and a second authentication challenge to gain access to the grid resources, wherein the first authentication challenge must be passed to gain access to the network access authentication server and wherein the second authentication challenge must be passed to gain access to the grid resources, wherein the second authentication challenge is performed after the first authentication challenge, and wherein initiating the network access authentication operation satisfies the first authentication challenge and successfully completes the network access authentication operation;
    providing the proxy certificate to the grid, wherein providing the proxy certificate to the grid satisfies the second authentication challenge, and whereby the network access authentication operation satisfies both the first authentication challenge and the second authentication challenge;
    after providing the proxy certificate to the grid, preparing a submission of a job into the grid, wherein preparing is performed by a grid-client application;
    finding, by the grid-client application, the proxy certificate; and
    responsive to finding the proxy certificate, foregoing generation of a new proxy certificate.

2. A data processing system comprising:
    a bus;
    a processor connected to the bus;
    a memory connected to the bus, wherein the memory stores a computer program product which, when executed by the processor, performs a computer implemented method comprising:
    initiating a network access authentication operation from a user device to a network access authentication server via a network access device, wherein initiating comprises transmitting to the network access device a private key associated with the user device and a public key associated with the user device;
    receiving information including a set of network access parameters at the user device in response to a successful completion of the network access authentication operation, wherein the information further comprises a proxy certificate generated by the network access authentication server, wherein the proxy certificate is a short-term session certificate with a limited lifetime on the order of a few hours, wherein the proxy certificate comprises second information copied from the public key, and wherein the proxy certificate is signed with the private key;
    storing the proxy certificate at the user device;
    sending a transaction request message from the user device into a grid via the network access device, wherein the transaction request message comprises the proxy certificate and a request to use grid resources, wherein the grid comprises a virtual organization of a plurality of computers that provide a collective sharing of computational capacity and data storage capacity while maintaining local autonomous control over individual computers in the plurality of computers, wherein a user is required to pass both a first authentication challenge and a second authentication challenge to gain access to the grid resources, wherein the first authentication challenge must be passed to gain access to the network access authentication server and wherein the second authentication challenge must be passed to gain access to the grid resources, wherein the second authentication challenge is performed after the first authentication challenge, and wherein initiating the network access authentication operation satisfies the first authentication challenge and successfully completes the network access authentication operation;

providing the proxy certificate to the grid, wherein providing the proxy certificate to the grid satisfies the second authentication challenge, and whereby the network access authentication operation satisfies both the first authentication challenge and the second authentication challenge;

after providing the proxy certificate to the grid, preparing a submission of a job into the grid, wherein preparing is performed by a grid-client application;

finding, by the grid-client application, the proxy certificate; and responsive to finding the proxy certificate, foregoing generation of a new proxy certificate.

* * * * *